US007520356B2

(12) United States Patent
Sadegh et al.

(10) Patent No.: US 7,520,356 B2
(45) Date of Patent: Apr. 21, 2009

(54) MODULAR WALL CLIMBING ROBOT WITH TRANSITION CAPABILITY

(75) Inventors: Ali M. Sadegh, Franklin Lakes, NJ (US); Jizhong Xiao, Lodi, NJ (US)

(73) Assignee: Research Foundation of the City University of New York, New York, NY (US)

( * ) Notice: Subject to any disclaimer, the term of this patent is extended or adjusted under 35 U.S.C. 154(b) by 447 days.

(21) Appl. No.: 11/400,654

(22) Filed: Apr. 7, 2006

(65) Prior Publication Data

US 2007/0235238 A1 Oct. 11, 2007

(51) Int. Cl.
*B60B 39/00* (2006.01)
(52) U.S. Cl. .................................. 180/164; 180/127
(58) Field of Classification Search ............... 180/164, 180/127, 117, 116, 901; 416/179, 185; 15/98
See application file for complete search history.

(56) References Cited

U.S. PATENT DOCUMENTS

| | | | | |
|---|---|---|---|---|
| 3,209,849 | A | * | 10/1965 | Gondert et al. ............ 180/164 |
| 3,246,711 | A | * | 4/1966 | Snoeyenbos ................ 180/164 |
| 3,810,515 | A | * | 5/1974 | Ingro ........................ 180/54.2 |
| 4,809,383 | A | * | 3/1989 | Urakami ........................ 15/98 |
| 5,194,032 | A | * | 3/1993 | Garfinkel .................... 446/178 |
| 5,288,528 | A | * | 2/1994 | Blanchet-Fincher ........ 427/596 |
| 5,551,525 | A | | 9/1996 | Pack et al. |
| 5,592,998 | A | * | 1/1997 | Urakami .................... 180/164 |
| 5,839,532 | A | | 11/1998 | Yoshiji et al. |
| 5,879,040 | A | | 3/1999 | Nagai et al. |
| 6,102,145 | A | * | 8/2000 | Fisher ........................ 180/164 |
| 6,276,478 | B1 | * | 8/2001 | Hopkins et al. ............. 180/164 |
| 6,497,553 | B2 | | 12/2002 | Illingworth et al. |
| 6,619,922 | B2 | | 9/2003 | Illingworth et al. |
| 6,691,811 | B2 | * | 2/2004 | Bruntrup et al. ............ 180/164 |
| 6,742,617 | B2 | | 6/2004 | Jeswine et al. |
| 6,793,026 | B1 | | 9/2004 | De Fazio |
| 6,872,439 | B2 | | 3/2005 | Fearing et al. |

(Continued)

OTHER PUBLICATIONS

J. C. Grieco, M. Prieto, M. Armada, and P. G. Santos, "A six-legged climbing robot for high payloads", 1998 IEEE International Conference on Control Applications, p. 446-450, Italy, 1998.

(Continued)

*Primary Examiner*—Tony H. Winner
(74) *Attorney, Agent, or Firm*—Hoffman & Baron, LLP; Irving N. Feit

(57) ABSTRACT

A mobile robot generally including a first suction module, a second suction module and a hinge assembly pivotably connecting the suction modules together. Each of the suction modules includes a support frame defining a vacuum chamber and a vacuum unit supported on the support frame and communicating with the vacuum chamber. The vacuum unit includes a rotating impeller and an exhaust cowling surrounding the impeller. The impeller has an axis of rotation and is adapted to draw air from the vacuum chamber into the impeller in a direction generally parallel to the impeller axis of rotation and to discharge the drawn air in a direction substantially perpendicular to the impeller axis of rotation. The exhaust cowling is adapted to redirect the discharged air, whereby a thrusting force is applied to the support frame in a direction opposite of the direction of the drawn air from the vacuum chamber.

20 Claims, 10 Drawing Sheets

U.S. PATENT DOCUMENTS 7,280,890 B2 * 10/2007 Seemann ............... 700/245

OTHER PUBLICATIONS

L. Guo, K. Rogers, and R. Kirkham, "A climbing robot with continuous motion", 1997 IEEE International Conference on Robotics and Automation, p. 2495-2500, USA 1997.

S. Hirose, H. Tsutsumitake, "Disk rover: a wall-climbing robot using permanent magnet disks", 1992 IEEE/RSJ International Conference on Intelligent Robots and Systems, p. 2074-2079, USA, 1992.

S. Galt, B.L. Luk, "Smooth and efficient walking motion and control for an 8-legged robot", UKACC International Conference on Control, vol. 2, p. 1652-1657, 1997.

A. Nagakubo, S. Hirose, "Walking and running of the quadruped wall-climbing robot", 1994 IEEE International Conference on Robotics and Automation, p. 1005-1012, 1994.

Paul G. Backes, et al, "The multifunction automated crawling system (MACS)". 1997 IEEE International Conference on Robotics and Automation, p. 335-340, USA, 1997.

J. Savall, A. Avello, L. Briones, "Two compact robots for remote inspection of hazardous areas in nuclear power plants", 1999 IEEE International Conference on Robotics and Automation, p. 1993-1998, 1999.

A. Nishi, "A wall climbing robot using propulsive force of propeller", Fifth International Conference on Advanced Robotics, p. 320-325, 1991.

A. Nishi, "Development of wall-climbing robots", Computer and Electrical Engineering, 22(2): 123-149, 1996.

J. Xiao, et. al., "Modeling, Control, and Motion Planning of a Climbing Micro-robot", Journal of Integrated Computer-aided Engineering, pp. 289-307, vol. 11, No. 4, 2004.

J. Xiao, et al., "Fuzzy Controller for Wall-climbing Micro-robots", IEEE Transaction on Fuzzy Systems, pp. 466-480, vol. 12, No. 4, Aug., 2004.

R. L. Tummala et al., "Climbing the Walls", IEEE Robotics and Automation Magazine, pp. 10-19, vol. 9, No. 4, Dec. 2002.

J. Xiao, et al., "DSP solution for wall-climber microrobot control using TMS320LF2407 chip", Proc. of the 43rd IEEE Midwest Symposium on Circuits and Systems, Lansing, Michigan, USA, 2000.

* cited by examiner

MODULAR WALL CLIMBING ROBOT WITH TRANSITION CAPABILITY

BACKGROUND OF THE INVENTION

The present invention relates generally to mobile robots and more particularly to robots capable of climbing and traversing horizontal, angled and vertical surfaces, including making transitions between the two.

It has been known in the art to provide mobile robots with the capability of moving in a two-dimensional plane to perform functions in the areas of national defense, surveillance and counter terrorism missions. Many successful robot platforms have emerged, but many of such mobile robots are limited to movement in a two-dimensional plane without wall-climbing capability.

Some robots have been developed with wall climbing capability by using magnetic devices, suction cups, or attraction force generated by a propeller. Applications for these types of climbing robots focused on inspection and maintenance tasks in hazardous environments, primarily in the nuclear, space, and chemical industries.

It has been a long-time desire to develop a miniature climbing robot with the ability to climb walls, walk on ceilings and transit between different surfaces, thus transforming the present two-dimensional world of mobile rovers into a new three-dimensional universe. For example, U.S. Pat. No. 5,839,532 to Yoshiji et al. discloses a vacuum wall walking apparatus having a frame and a plurality of leg mechanisms with suction cups. The frame is composed of a flexible member, making the frame bendable to conform to the profile of a curved surface when the device is used with a wall having such a curved surface.

Other robots developed for traversing nonplanar surfaces use articulated structure. For example, U.S. Pat. No. 5,551,525 to Pack et al. discloses a climber robot having front and rear legs joined together by a pivoting knee joint and having pivoting ankle joints at their distal ends. Pneumatic muscle pairs attached to each leg allow the robot to transition from the horizontal to the vertical plane.

U.S. Pat. No. 6,619,922 to Illingworth et al. discloses a vortex attractor for planar and non-planar surfaces using a so-called "tornado in the cup" technology. However this prior art has limited payload and has difficulty climbing from a wall to a ceiling or around a corner.

Accordingly, it would be desirable to improve upon the prior art by developing new concepts of modularity and mobility for a climbing robot capable of moving between nonplanar surfaces. It would be further desirable to overcome the limitations of prior art robots in terms of robot capability, modularity, control performance, and intelligence to perform various defense, security, and inspection missions.

SUMMARY OF THE INVENTION

The present invention is a mobile robot generally including a first suction module, a second suction module and a hinge assembly pivotably connecting the suction modules together. (However, it is conceivable that additional suction modules can be employed.) Each of the suction modules includes a support frame defining a vacuum chamber and a vacuum unit supported on the support frame and communicating with the vacuum chamber. The vacuum unit includes a rotating impeller and an exhaust cowling surrounding the impeller. The impeller has an axis of rotation and is adapted to draw air from the vacuum chamber into the impeller in a direction generally parallel to the impeller axis of rotation. The impeller is further adapted to discharge the drawn air from the impeller in a direction substantially perpendicular to the impeller axis of rotation. The exhaust cowling is adapted to redirect the discharged air from the impeller in a direction substantially parallel to the impeller axis of rotation out of the vacuum unit, whereby a thrusting force is applied to the support frame in a direction opposite of the direction of the drawn air from the vacuum chamber. The hinge assembly facilitates nonplanar orientation of the first suction module with respect to the second suction module.

In a preferred embodiment, the hinge assembly includes a hinge element fixed to one of the suction modules, a bracket element fixed to the other of the suction modules and coupled to the hinge element about a pivot point and a motor disposed at the pivot point for pivoting the hinge element with respect to the bracket element about the pivot point. In this regard, the support frames of the suction modules are preferably triangular in shape for reducing the torque at the hinge assembly. With this arrangement, the first suction module can be pivoted with respect to the second suction module through an angular range of between +90° and −90°. Other shaped modules, such as circular, rectangular, oval and polygonal, may also be utilized.

The vacuum unit exhaust cowling of the suction module preferably includes bowl shaped inner and outer cowlings. Each of the inner and outer cowlings has a bottom and a dome shaped wall extending upwardly from the bottom. The inner cowling is seated in the outer cowling, whereby an annular chamber is formed between the upwardly extending walls of the cowlings for redirecting the discharged air from the impeller. The impeller is disposed between the bottoms of the cowlings and is in communication with the annular chamber.

The support frame of the suction module preferably includes a support plate supporting the vacuum unit and fixed to the hinge assembly and a flexible skirt extending downwardly from the support plate. The support plate is preferably connected to the skirt by a flexible joint. The flexible joint allows for a relative displacement between the support plate and the flexible skirt to enhance sealing of the skirt against a surface.

Each of the suction modules further preferably includes at least one drive wheel provided on the support frame for translating the suction module across a surface. More preferably, each of the suction modules includes two independently controlled drive wheels provided on the support plate in a coaxial arrangement and a castor wheel rotatably supported on the support plate As a result of the present invention, a wall climbing robot is provided, which utilizes aerodynamic attraction technology to achieve balance between strong attraction force and maneuverability. The new sealing and rim isolation system makes the robot flexible to go over uneven surfaces, and further allows for wall-to-ceiling and wall-to-wall transitions. The robot of the present invention can carry double the payload of conventional wall climber robots, such as the vortex climber.

The preferred embodiments of the wall climbing robot of the present invention, as well as other objects, features and advantages of this invention, will be apparent from the following detailed description, which is to be read in conjunction with the accompanying drawings. The scope of the invention will be pointed out in the claims.

BRIEF DESCRIPTION OF THE DRAWINGS

FIG. 6b is a schematic cross-section of a suction module illustrating the flexible joint with the vacuum rotor unit turned on.

DETAILED DESCRIPTION OF THE PREFERRED EMBODIMENTS

Figure 1:
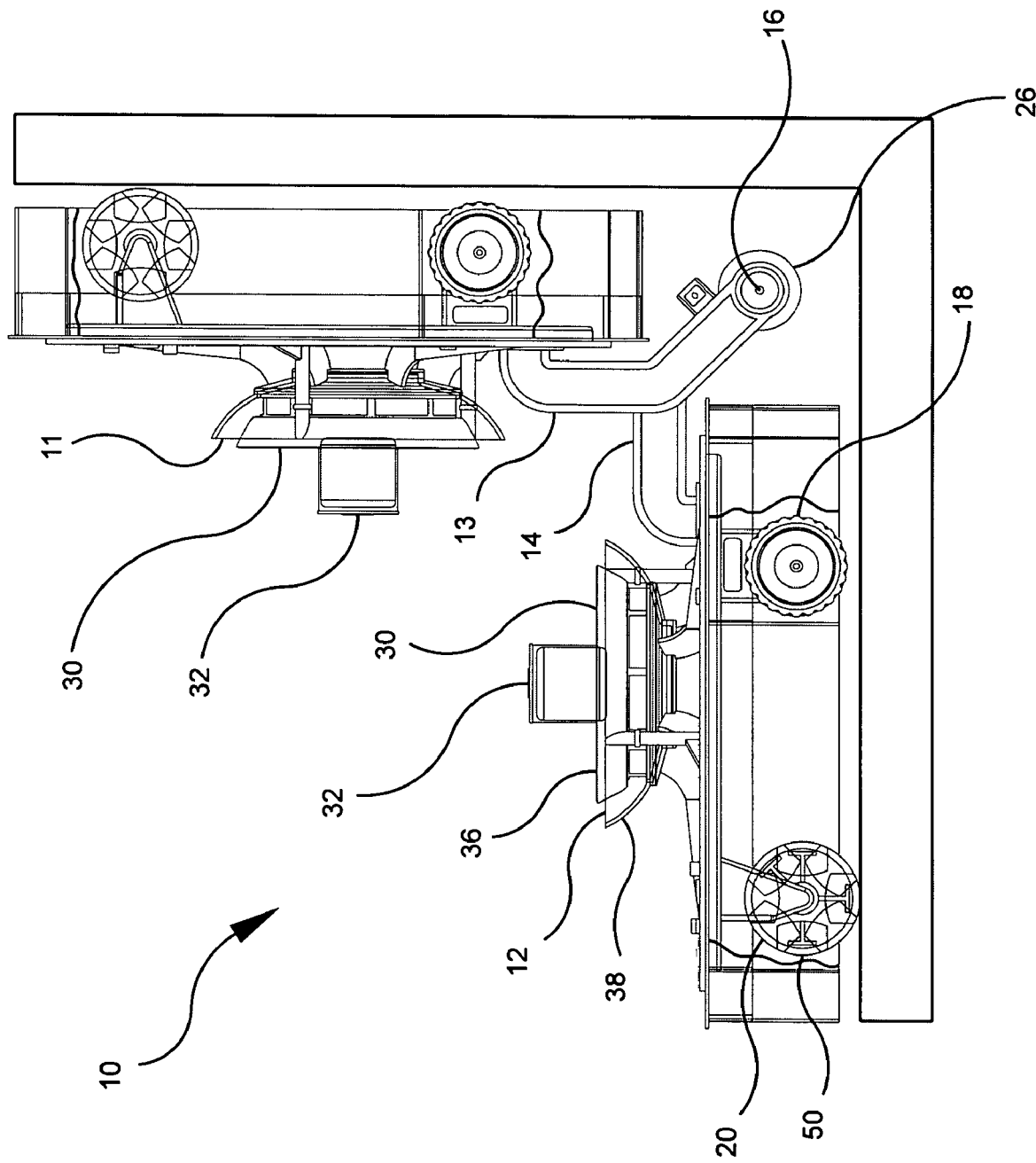
FIG. 1 is a side view of the climbing robot of the present invention traversing two surfaces forming an inner corner.
Figure 2:
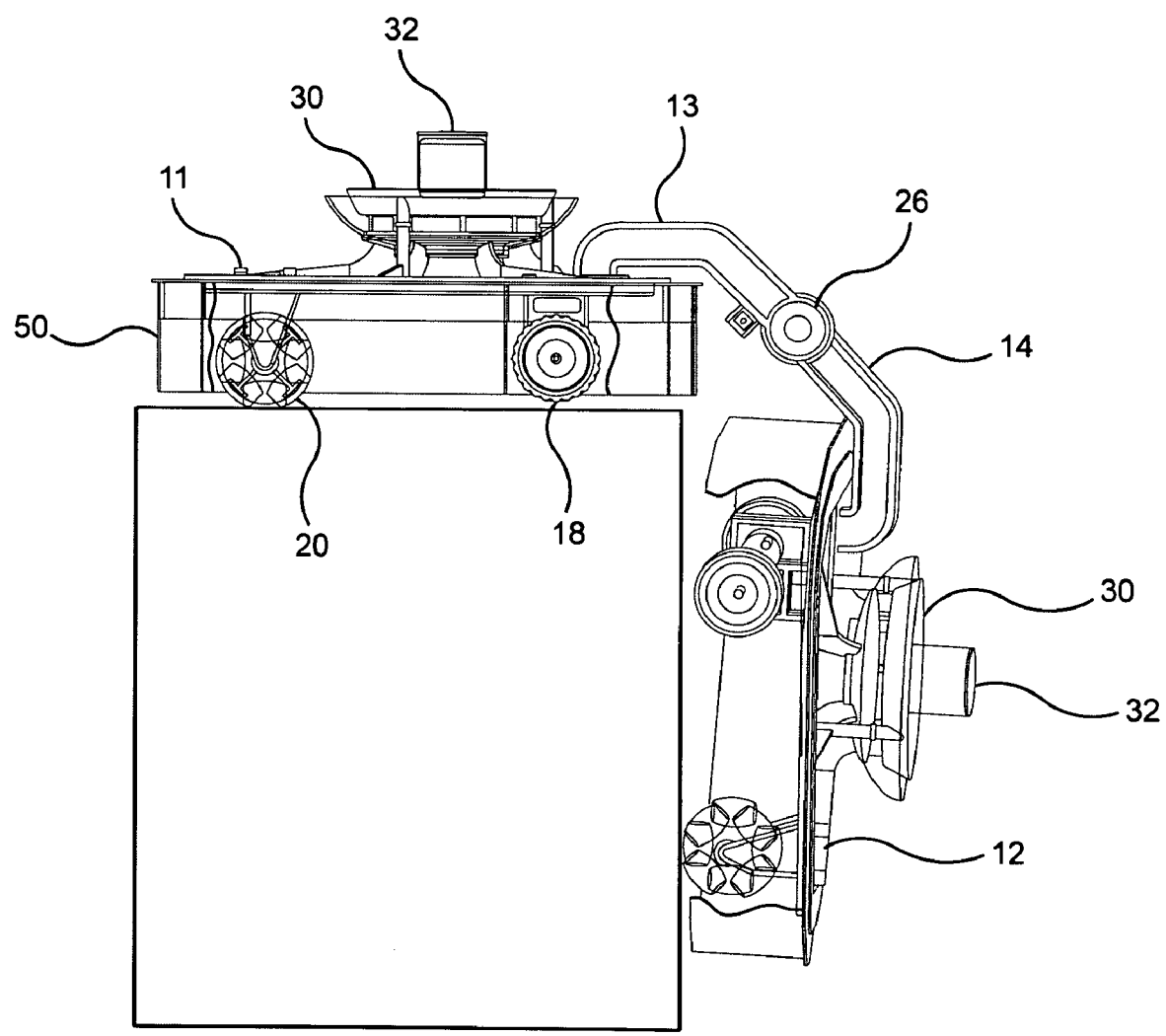
FIG. 2 is a side view of the climbing robot of the present invention traversing two surfaces forming an outer corner.

Referring first to FIGS. 1 and 2, the wall climbing robot 10 of the present invention generally includes at least two suction modules 11 and 12 pivotably connected together by a hinge assembly consisting of a bracket 13 and hinge 14 arrangement. In particular, a bracket 13 can be fixed to a first suction module 11 and a hinge 14 can be fixed to a second suction module 12. The bracket 13 and hinge 14 are connected together about a pivot point 16, which allows the first suction module 11 to pivot with respect to the second suction module 12. Each suction module of the climbing robot 10 can be designed to operate independently, as shown in FIGS. 1 and 2, or several wall climbing robots 10 can be configured to form a larger robot that will be able to carry more payloads for complex tasks.

The design of the wall climbing robot 10 can be divided into four main components. The first component involves the locomotion mechanism, which is responsible for the planar motion of the robot 10 on a surface. The second component involves the transition mechanism, which is needed to connect the suction modules 11 and 12 and to achieve wall-to-wall transitions. The last two components are the adhesion mechanism and the vacuum chamber seal. Combined together, these components enable the robot 10 to "stick" to wall surfaces.

Figure 3:
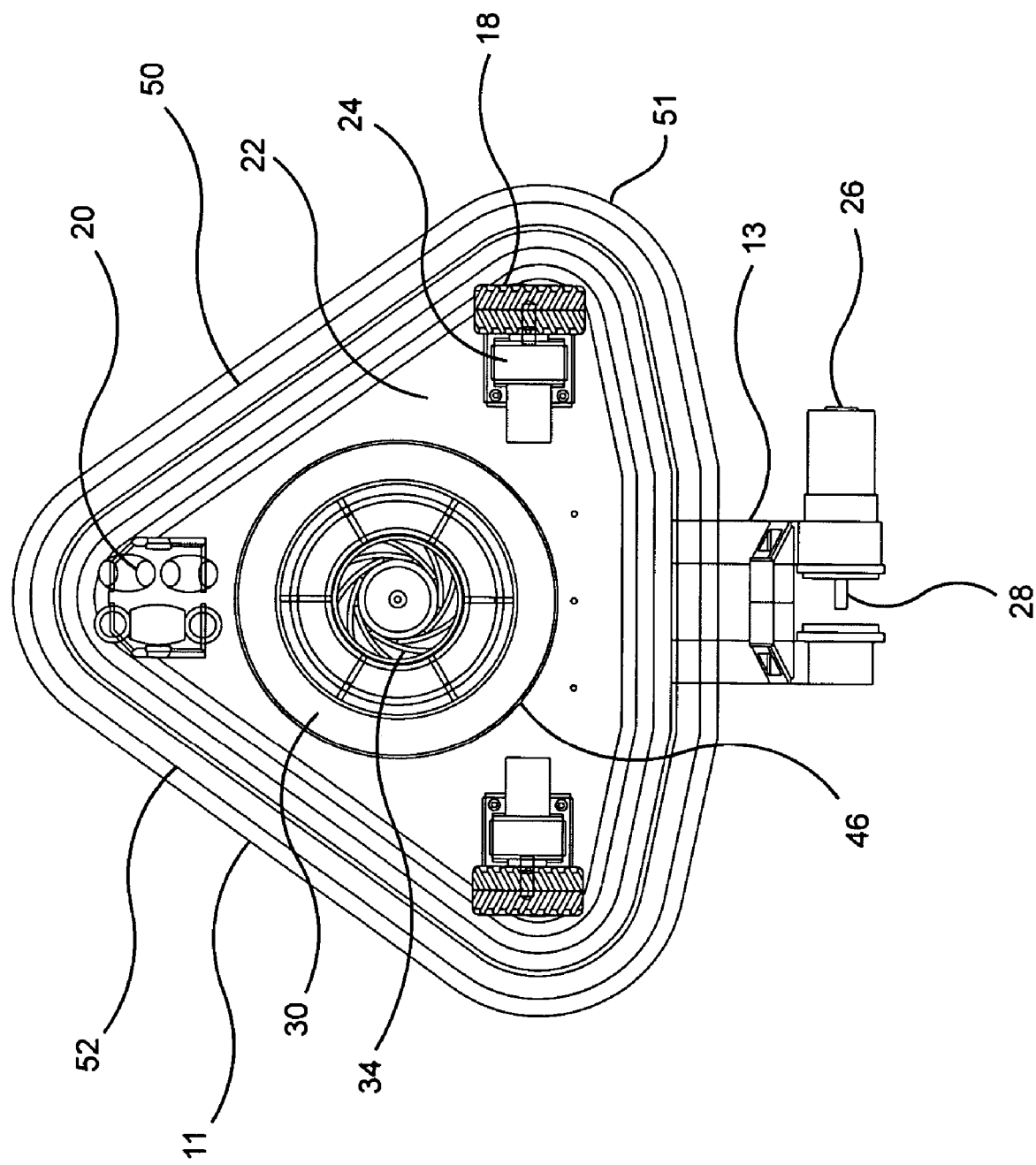
FIG. 3 is a bottom plan view of the first suction module shown in FIGS. 1 and 2.
Figure 4:
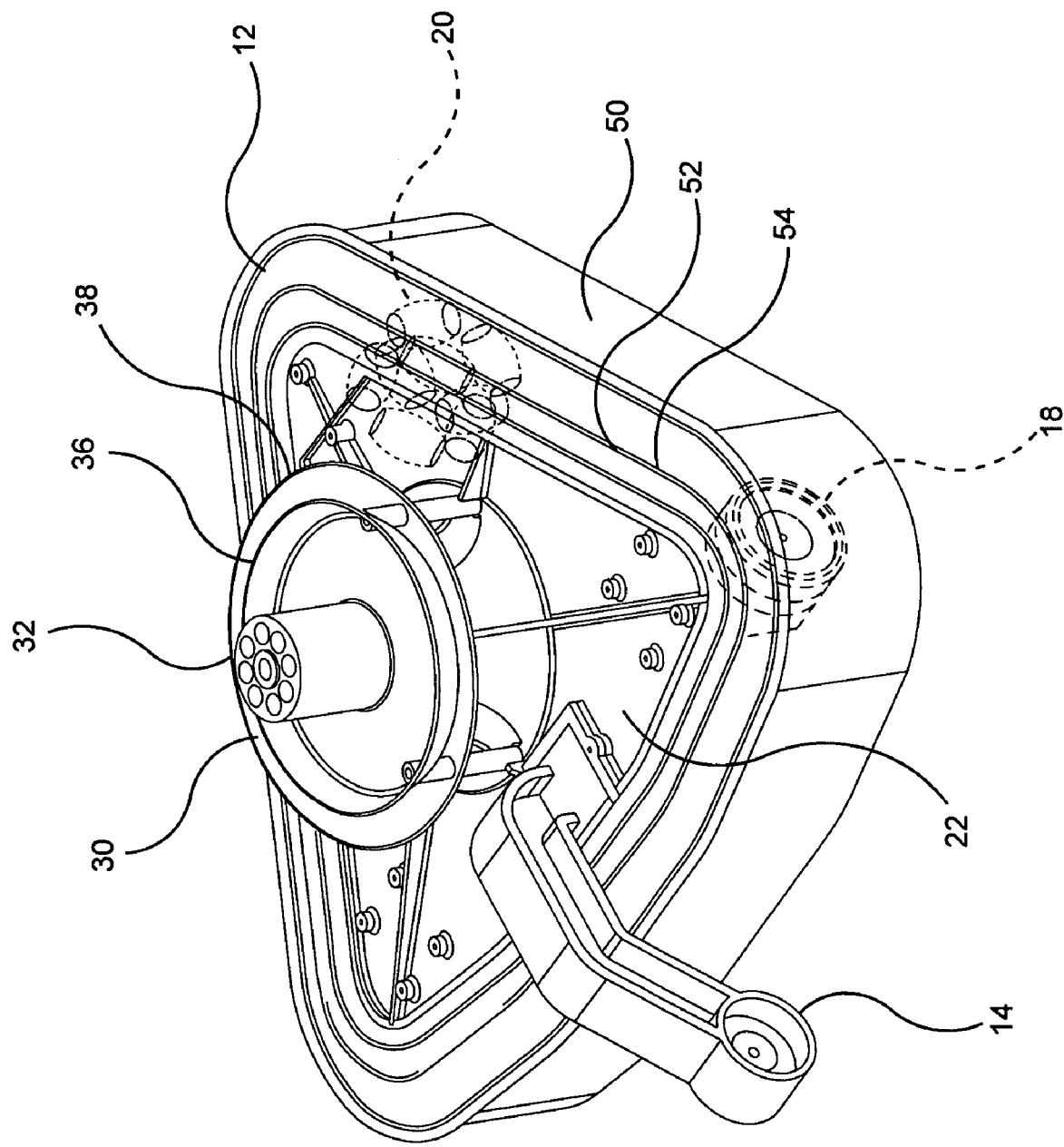
FIG. 4 is a top perspective view of the second suction module shown in FIGS. 1 and 2.

Referring additionally to FIGS. 3 and 4, the locomotion mechanism involves an internal three wheel drive provided on each suction module 11 and 12. In particular, each suction module 11 and 12 is provided with two drive wheels 18 and one castor wheel 20. The drive wheels 18 and the castor wheel 20 are rotatably supported on a centrally disposed support plate 22. The drive wheels 18 and the castor wheel 20 are preferably arranged in a triangle with the drive wheels being coaxial. Each drive wheel 18 is individually controlled by a drive motor 24 fixed to the support plate 22. The drive wheels 18 rotate about a single common axis, while the castor wheel 20 is permitted to rotate about multiple axes. Thus, each suction module 11 and 12 utilizes a differential drive principle, wherein the left and right drive wheels 18 are controlled independently and the robot turning angle is determined by the speed difference between the motors 24 driving the two drive wheels.

Such wheeled locomotion allows for quick motion of the robot 10 on planar surfaces. However, in order to enable the robot 10 to transition from one surface to another nonplanar surface, a transition mechanism is provided. The transition mechanism involves an articulated structure connecting the two wall-climber modules 11 and 12 together to achieve smooth transitions between nonplanar surfaces. As mentioned above, this articulated structure involves a "tilt/lift-hinge" sub-assembly including a bracket 13 fixed to the first suction module 11 and a hinge 14 fixed to the second suction module, wherein the bracket and hinge are connected about a common pivot point 16. A hinge motor 26 is fixed to the bracket 13 and includes a rotating drive shaft 28 fixed to the hinge 14. Thus, operation of the hinge motor 26 causes the hinge 14 to pivot with respect to the bracket 13. Such pivoting causes the first suction module 11 to move with respect to the second suction module 12. In this regard, each suction module 11 and 12 is preferably designed with a triangle shape to reduce the torque needed by the hinge motor 26 to lift one module with respect to the other module.

FIG. 1 shows the two suction modules 11 and 12, wherein the bracket 13 and hinge 14 are operated in gang mode so that the modules are positioned relative to the other in a +90° orientation. Such orientation would be useful, for example, in traversing an inner corner formed between two adjoining walls or between a wall and a ceiling. FIG. 2 shows the two suction modules 11 and 12, wherein the bracket 13 and hinge 14 are operated in gang mode so that the modules are positioned relative to the other in a −90° orientation. Such orientation would be useful, for example, in traversing over an outer corner or edge of a structure.

Responding to electronic controls, the drive motors 24 and the hinge motor 26 can perform a sequence of translation and tilting actions that would result in the pair of modules 11 and 12 navigating as a unit between two tangent planar surfaces. The drive motors 24 and the hinge motor 26 are preferably DC servo motors with encoder feedback for precise closed-loop position control.

Figure 5:
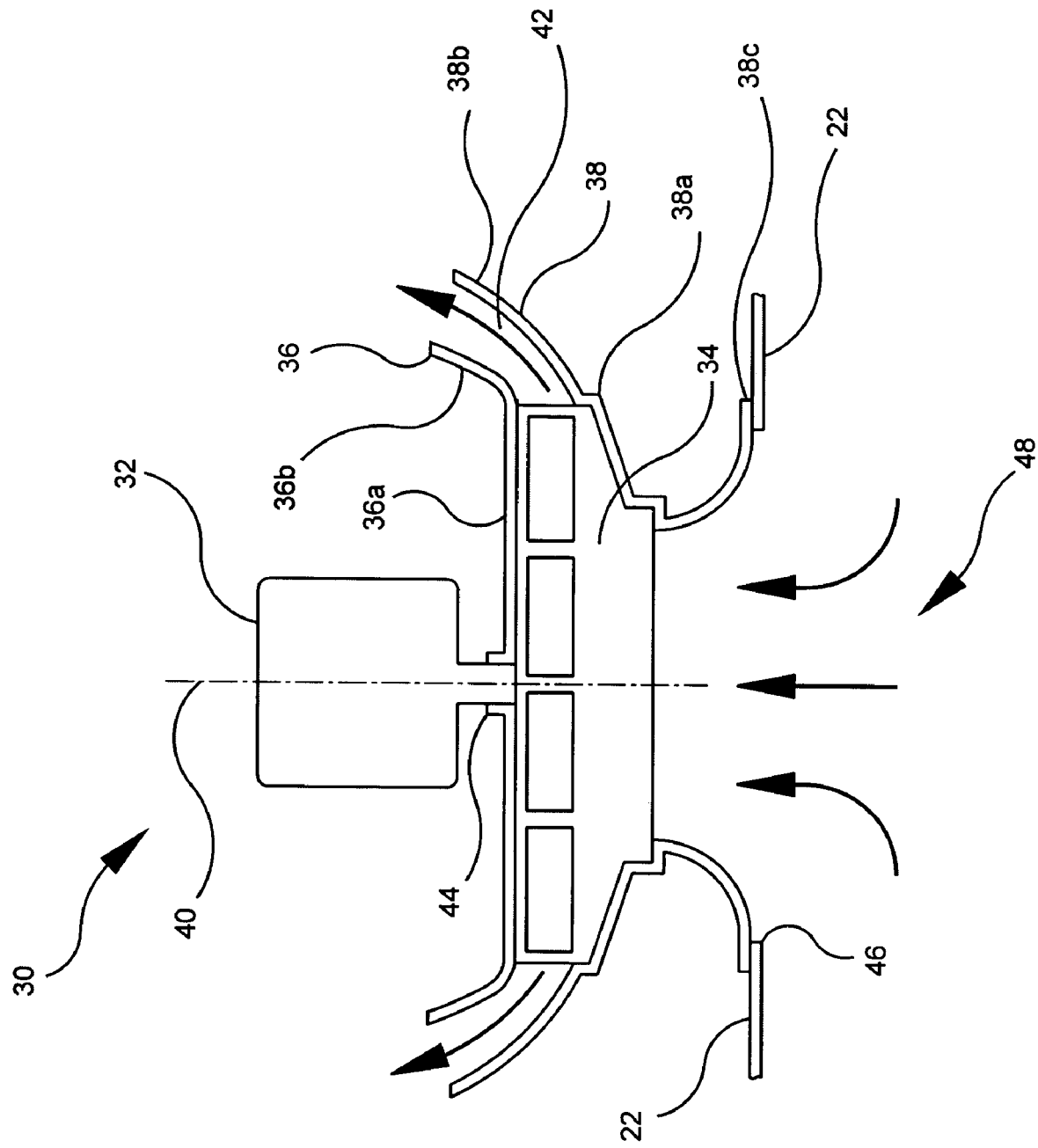
FIG. 5 is a cross-sectional view of the vacuum rotor unit of each suction module.

The next major design component of the present invention is the vacuum rotor unit 30 provided on each suction module 11 and 12 for providing the adhesion mechanism for the robot 10. Referring additionally to FIG. 5, the vacuum rotor unit 30 includes a vacuum motor 32, a circular impeller 34, an inner exhaust cowling 36 and an outer exhaust cowling 38. The vacuum motor 32 is connected to the impeller 34 for rotating the impeller about an axis of rotation 40. Rotation of the impeller 34 draws intake air into the impeller in a direction parallel to the axis of rotation 40 and directs exhaust air out of the impeller in a direction perpendicular to the axis of rotation.

The inner and outer exhaust cowlings 36 and 38 are preferably, generally bowl shaped and have a radial center, which is aligned with the center of rotation 40 of the impeller 34 when assembled together. Each exhaust cowling 36 and 38 includes a bottom 36a and 38a and a dome shaped wall 36b and 38b extending upwardly from the bottom. The outer exhaust cowling 38 further preferably includes an intake hood 38c extending downwardly from the bottom 38a opposite the dome shaped wall 38b.

The inner exhaust cowling 36 is seated within the outer exhaust cowling 38, whereby an annular chamber 42 is formed between the upwardly extending dome shaped walls 36b and 38b of the inner and outer exhaust cowlings, as shown in FIG. 5. The impeller 34 is sandwiched between the bottoms 36a and 38a of the exhaust cowlings 36 and 38 and communicates with the annular chamber 42. The inner exhaust cowling 36 has an opening 44 for allowing connection of the vacuum motor 32 to the impeller 34.

The impeller 34 is free to rotate between the inner and outer exhaust cowlings 36 and 38 to draw inlet air from the intake hood 38c of the outer cowling 38, through the bottom 38a of the outer cowling and into the impeller. As the vacuum motor 32 rotates the impeller 34, the air is then redirected in a direction perpendicular to the axis of rotation 40 of the impeller into the annular chamber 44 defined by the upwardly extending dome shaped walls 36b and 38b of the inner and outer exhaust cowlings.

A vacuum rotor unit 30 is disposed over an opening 46 formed in the support plate 22 of each suction module 11 and 12. The vacuum rotor unit 30 is preferably assembled to the support plate 22 so that an air-tight seal is formed between the intake hood 38c of the outer exhaust cowling 38 and the support plate. Air is thus drawn through the opening 46 in the support plate 22 into the intake hood 38c and then upward into the impeller 34.

Thus, the vacuum rotor unit 30 is a radial flow device, which combines two types of airflow. The high-speed rotation of the impeller 34 causes air to be pulled upward along the spin axis 40 toward the impeller 34 creating a low-pressure or partial vacuum chamber 48 below the support plate 22. The air drawn into the impeller 34 is then accelerated toward the outer perimeter of the exhaust cowlings 36 and 38, away from the radial center in a direction generally perpendicular to the axis of rotation 40. As a result of the dome-shaped walls 36b and 38b of the inner and outer exhaust cowlings 36 and 38, the resultant exhaust air is directed upwardly toward the rear of the unit 30, again in a direction generally parallel to the impeller axis of rotation 40. The force of air directed on the cowling structure causes a downward thrusting force, which helps to increase the adhesion of the suction module 11 and 12 against a surface.

To sufficiently seal the vacuum region 48, each suction module 11 and 12 includes a flexible skirt 50 extending downwardly from the support plate 22 in a direction opposite of the vacuum unit 30. The flexible skirt 50 and the support plate together form a support frame 51, which defines the vacuum chamber 48. The flexible skirt 50 seals the vacuum chamber 48 against the surface to which the suction module 11 and 12 is adhering. The flexible skirt 50 may consist of a thin sheet of flexible plastic material, a densely packed arrangement of bristles, or a combination of the two to achieve a desirable balance between sealing and mobility.

In another embodiment, a compliant and flexible air inflated tube may be used instead of the skirt 50. That is, the tube is placed around the circumference of the module and provides a sealing for the vacuum chamber, but is flexible to pass over most obstacles. The air pressure of the tube may be adjusted depending on the roughness of the traveling surface. High pressure in the tube provides good sealing, whereas low pressure makes it easier for the robot to move. Therefore, the air pressure is preferably optimized to provide a balance between good sealing and ease of robot maneuverability. This can be achieved by installing pressure sensors to monitor the pressure inside the vacuum chamber and micro-valves to control the inflation of the tube.

In a preferred embodiment, the flexible skirt 50 is attached to the support plate 22 with a flexible joint 52. The flexible joint 52 is preferably made from a refoam, plastic or rubber material and is formed with a raised hinge portion 54 to further enhance flexibility. As will be discussed in further detail below, the flexible joint 52 allows for a slight displacement between the support plate 22 and the skirt 50. This results in improved robot mobility and enhanced sealing of the vacuum chamber 48 by reducing the deformation of the skirt. The flexible joint 52 also allows the robot to maneuver over uneven surfaces with obstacles.

Figure 6A:
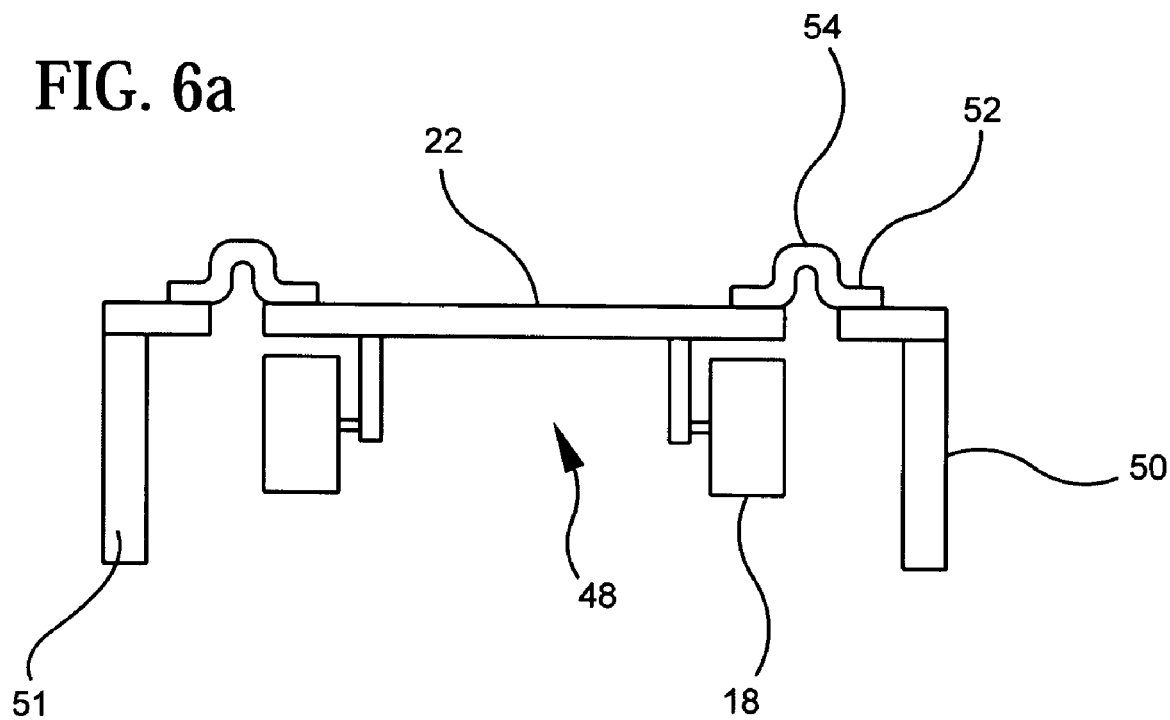
FIG. 6a is a schematic cross-section of a suction module illustrating the flexible joint with the vacuum rotor unit turned off.
Figure 6B:
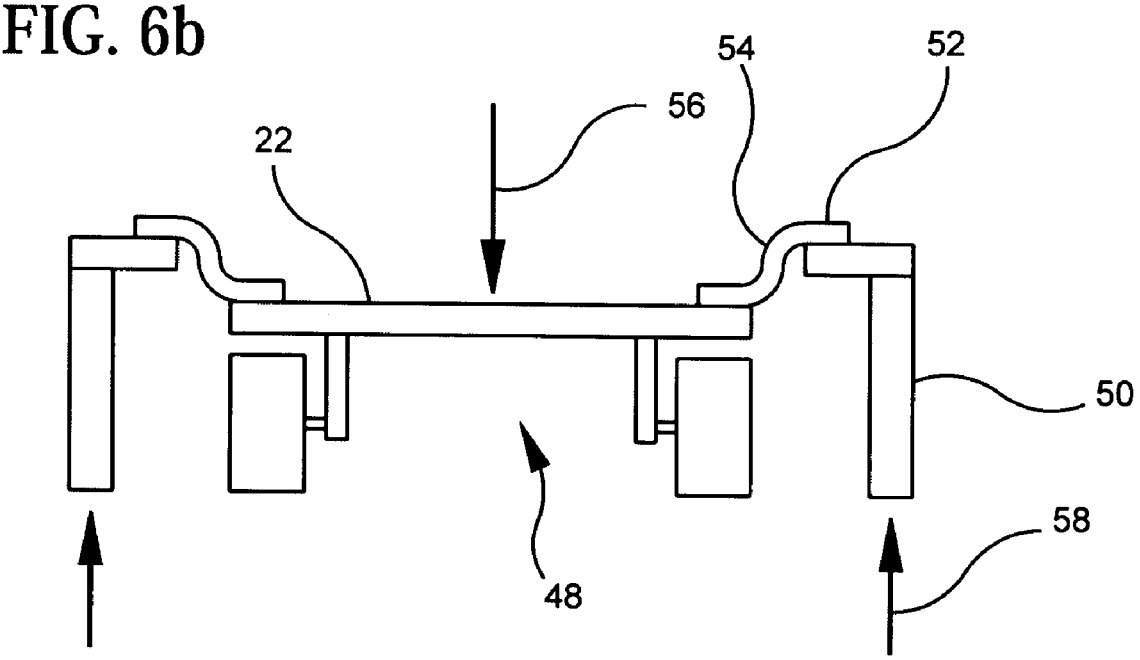

More specifically, the flexibility of the skirt 50 allows the module 11 and 12 to freely slide on rough or uneven surface, while maintaining a seal for the vacuum region 48. The flexible joint 52 connecting the support plate 22 and the skirt 50 reduces deformation by the skirt by absorbing some of the force directed on the skirt by the vacuum unit. For example, FIG. 6a shows the flexible joint 52 in a relaxed state when the vacuum unit 30 is not activated. As discussed above, when the vacuum unit 30 is activated, it exerts a downward force 56 on the support plate 22 due to the vacuum chamber 48 formed below the support plate, as well as the outlet force generated by the exhaust cowlings 36 and 38. This downward force 56 is absorbed by the flexible joint 52 to reduce deformation of the skirt 50, which experiences an opposite reaction force 58, as shown in FIG. 6b.

Figure 7:
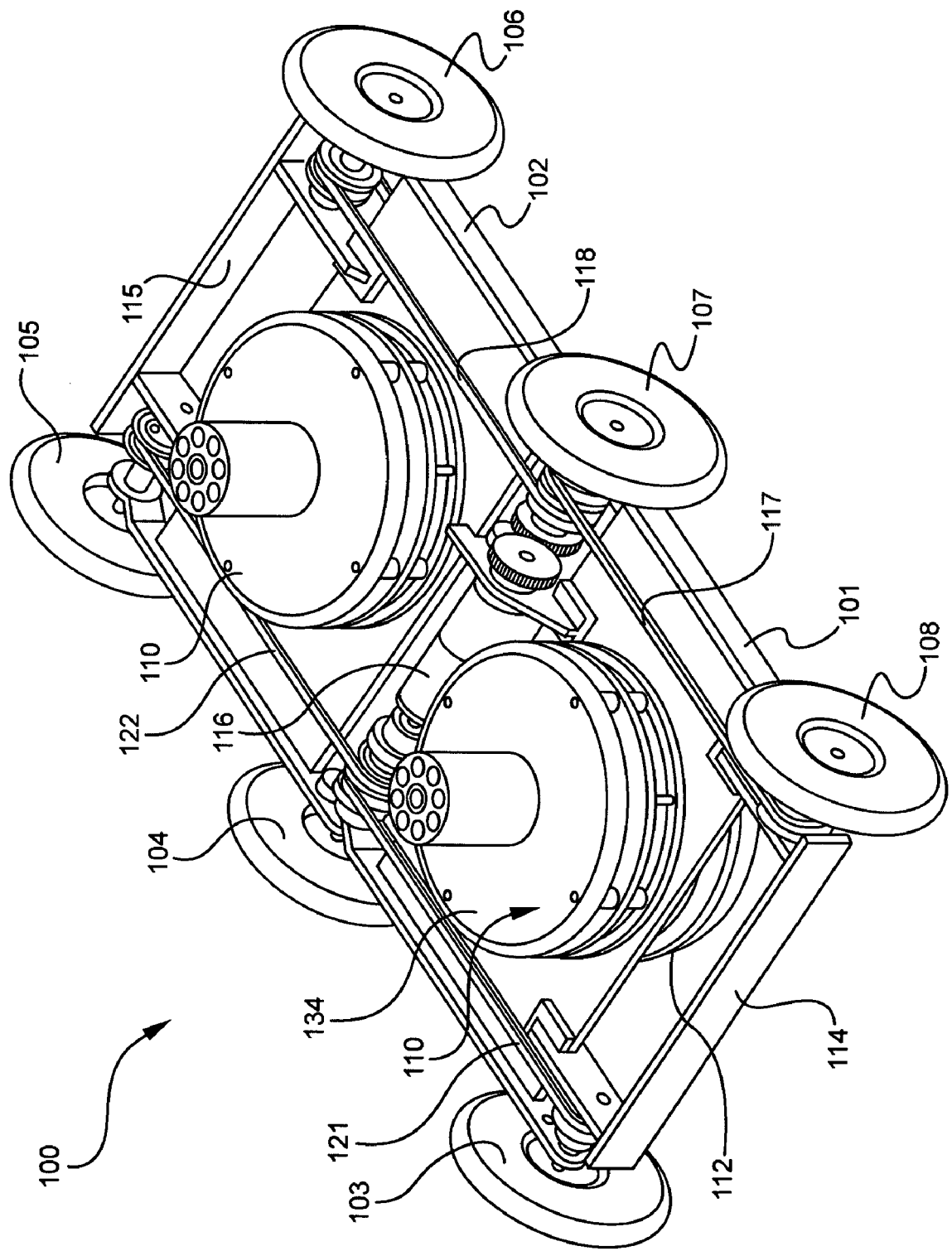
FIG. 7 is a top perspective view of an alternative embodiment of the climbing robot of the present invention.
Figure 8:
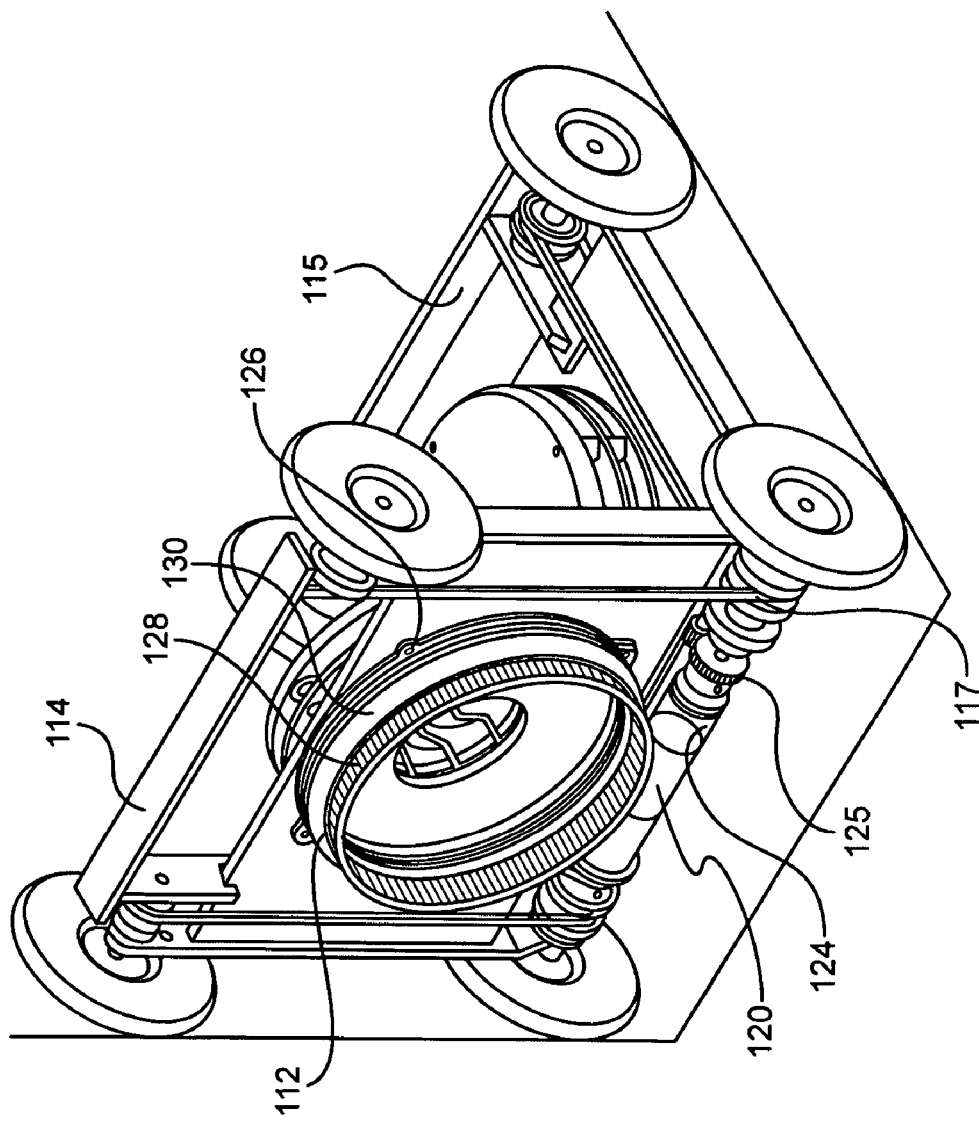
FIG. 8 is a top perspective view of the robot shown in FIG. 9 traversing two surfaces forming an inner corner.

FIGS. 7 and 8 show a smaller and more compact wall climbing robot 100 in an alternative embodiment of the present invention. In this embodiment, the wall climbing robot 100 includes two suction modules 101 and 102, six wheels 103, 104, 105, 106, 107 and 108, two suction system assemblies 110 and two skirt assemblies 112. The front module 101 has a bumper 114 and the rear module 102 has a bumper 115. The three wheels on the left side 103, 104 and 105 are driven together by a left drive motor 116 through two timing belts 117 and 118. Similarly, the right wheels 106, 107 and 108 are driven together by a right drive motor 120 and two timing belts 121 and 122. Thus, the left and the right drive motors 116 and 120 independently turn the left and the right side wheels in order to turn the robot to the left or to the right.

To climb up a wall or move from one plane to the next, there is a hinge motor 124, which cause the two modules 101 and 102 to pivot with respect to one another. The hinge motor 124 is located at the joint between the two suction modules 101 and 102. The left drive motor 116 is disposed on the top surface of the first suction module 101, whereas the right drive motor 120 is located under the surface of the second suction module 102. This arrangement allows both motors to pivot without interfering with each other, such as when the robot is transitioning up a vertical wall, as shown in FIG. 8.

The body of the hinge motor 124 is rigidly connected to the first suction module 101 through a bracket and the output of the motor is rigidly connected to a gear arrangement 125. Upon rotation of the hinge motor 124 the first suction module 101 rotates with respect to the second suction module 102. Similarly, the left drive motor 116 is rigidly connected to the first suction module 101 through a bracket and the output is connected to a gear arrangement, which drives the timing belts 121 and 122 and the right side drive system assembly is a mirror image of the left drive system assembly.

The skirt assembly 112 for each suction module is similar to that described above. In particular, each skirt assembly 112 includes a mounting bracket 126 fixed to the frame of the suction module, a skirt brush 128 extending downward and a flexible seal 130 connecting the skirt brush to the mounting bracket. In this manner, the skirt brush 128 is allowed some movement with respect to the module. The function of the skirt assembly 112 is similar to that described above.

The suction system assembly 110 is also similar to that described above. Specifically, each assembly 110 includes a motor 132, an impeller 134 and an exhaust cowl (not shown in FIGS. 7 and 8). The suction assembly 110 operates the same as that described above.

Figure 9:
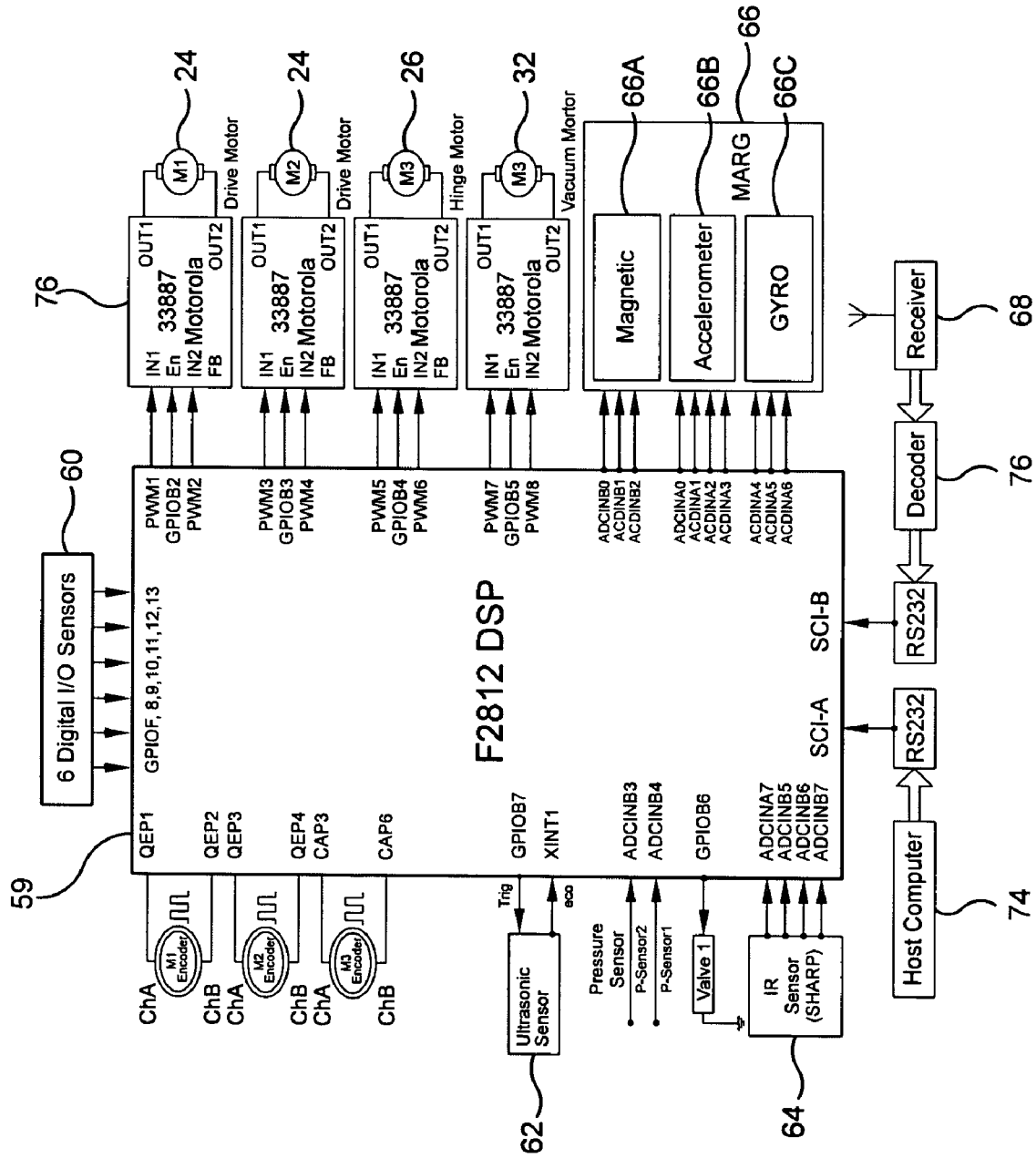
FIG. 9 is an electrical schematic diagram of the DSP-based control system of the present invention.

In both embodiments, the robot 10 is a self-contained system having its own power source (e.g., batteries), sensors, control system, and associated hardware. As such, it will be desirable to minimize robot weight and power consumption to prolong operation. With this in mind, the present invention preferably includes a digital signal processing (DSP) chip, or other micro-processor, to control the system. A suitable microprocessor 59 for use with the DSP-based system of the present invention is Model No. TMS320F2812 from Texas Instruments, Inc. The F2812 is a 32-bit DSP controller provides high-speed and large memory space making the real-time implementation of advanced control algorithms possible. The on-chip CAN-bus (control area network) also makes the interconnection of several wall-climber modules easy. FIG. 9 illustrates the hardware connections based on the F2812 DSP chip.

Figure 10:
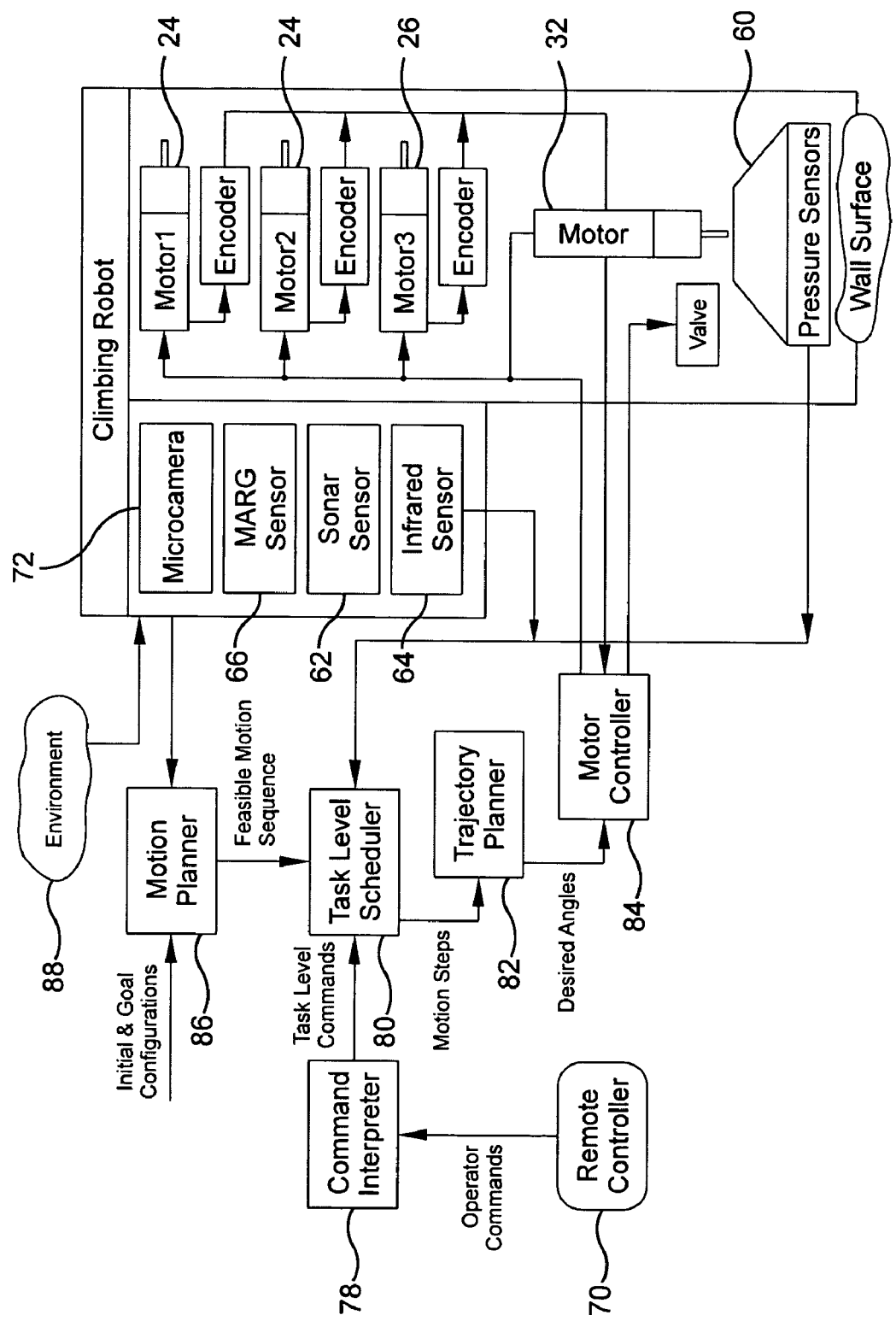
FIG. 10 is a block diagram of the control system of the present invention.

As additionally shown in FIG. 10, the primary sensor components that are preferably provided on the robot 10 of the present invention include: pressure sensors 60, for monitoring the pressure level inside the vacuum chamber 48; ultrasonic sensors 62 and infrared (IR) sensors 64, for distance measurement and obstacle avoidance; and MARG (Magnetic, Angular Rate, and Gravity) sensors 66, for tilt angle and orientation detection. For remote control operation, the robot 10 preferably has a wireless receiver module 68, which communicates with the transmitter module in a remote controller 70.

Apart from the above primary sensors, additional application sensors can be installed on the robot 10 as payloads when required by specific tasks. For example, a wireless pin-hole camera 72 can be installed for reconnaissance purposes, wherein video images can be transmitted to and processed at a host computer 74.

The DSP controller 59 produces pulse width modulation (PWM) signals and preferably drives the motors 24, 26 and 32 via one or more power electronic chips. Four Motorola H-bridge chips 76 are shown, as an example. The F2812 DSP chip has two built-in quadrature encoder pulse (QEP) circuits. The encoder readings of the two drive motors 24 can be obtained using the QEP channels while a software solution can be implemented to get encoder reading of the hinge motor 26 using the Capture units of the DSP.

With the encoder feedback, a closed-loop control is formed to generate accurate speed/position control of the drive motors 24 and the hinge motor 26 for each suction module 11 and 12. The speed of the vacuum motor 32 is adjusted with the feedback from the pressure sensors 60. Using an Analog to Digital Converter (ADC), the pressure inside the vacuum chamber 48 can be monitored continuously. For example, if the pressure is lower than a threshold, the speed of the vacuum motor 32 is increased to generate more suction force. If the pressure is higher than a threshold, the speed of the vacuum motor 32 is decreased to reduce the pressure. In this manner, an ideal pressure in the vacuum chamber 48 can be maintained to keep the robot "sticking" to a surface, while at the same time maintaining robot mobility.

The climbing robot 10 can be operated both manually and semi-autonomously. The infrared sensors 64 can be used to measure distances from close proximity objects, while the ultrasonic sensors 62 can be used to measure distance from objects that are far away. The infrared sensor 64 preferably has a reliable reading in the range of 10 cm to 80 cm and the ultrasonic sensor 62 preferably has a reliable range between 4 cm to 340 cm. An external interrupt (XINT) channel can be connected to the ultrasonic sensor 62 to measure the time-of-fly of sound chirp and convert the measurement to distance reading.

In order for the climbing robot 10 to understand its orientation and tilt angle, the MARG sensor 66 can be composed of nine sensor components of three different types affixed in X-Y-Z three axes: a magnetic sensor 66a, an accelerometer 66b, and a gyro 66c. The magnetic sensors 66a allow the robot 10 to know its orientation with respect to a reference point (i.e., the north pole). The accelerometers 66b measure the gravity in three axes and thus provide tilt angle information to the robot 10. The gyro sensors 66c measure angular rates which are used in the associated filtering algorithm to compensate for dynamic effects. The DSP controller 59 preferably processes the inputs from the nine MARG sensor components via ADC and provides the robot with dynamic estimation of three-dimensional orientation.

There are preferably two ways the DSP controller 59 communicates with external sources. The host computer 74 can exchange data with the DSP controller 59 via serial communication interface (SCI) using RS232 protocol. Another source that can send commands to the DSP controller 59 is the radio remote controller 70. This can be accomplished by interfacing the receiver 68 with a decoder 76 and then translating the commands into a RS232 protocol compatible with SCI module.

Other blocks shown in FIG. 10 represent possible on-board software modules including a command interpreter 78, a task level scheduler 80, a trajectory planner 82, a motor controller 84 and a motion planner 86. The operator commands, such as "move forward" and "make left turn" are transmitted from the remote controller 70 held by a human operator and decoded by the on-board command interpreter 78. The generated task level commands are then fed into the task level scheduler 80. The task level scheduler 80 uses a finite state machine to keep track of robot motion status and refine the command into several motion steps. The trajectory planner 82 interpolates the path to generate a set of desired joint angles. The digital motor controller 84 then drives each motor 24, 26 and 32 to the desired set points so that the suction modules 11 and 12 move the robot 10 to the desired location.

The robot 10 can also have motion planning ability, wherein the motion planner 86 generates a feasible motion sequence and transmits it to the task level scheduler 80. After the motion sequence has been executed, the robot 10 is able to travel from its initial configuration to its goal configuration, while avoiding any obstacles in the environment 88.

As a result of the present invention, a wall climbing robot is provided, which utilizes new concepts of modularity and mobility for moving from ground to vertical wall, wall to ceiling and between surfaces. The wall-climbing robot of the present invention includes a novel design for the adhesive mechanism to ensure that the robot can navigate on essentially any kinds of wall surfaces, such as brick, wood, glass, stucco, plaster, gypsum board, and metal. A new flexible bristle skirt provides sealing and mobility through a pressure force isolation rim connecting the vacuum plate and the bristle skirt. The robot also has a modular and reconfigurable mechanical design which combines wheeled locomotion and articulated structure to achieve both quick motion and smooth transition between two inclined surfaces. The robot further includes a DSP-based embedded system which integrates sensing, control, planning and makes the real-time implementation of advanced control algorithms possible.

One potential application of the wall-climbing robot system is in the area of inspection and maintenance. For example, the robot can be utilized for routine inspection of buildings, bridges, nuclear containment domes, city pipelines, and other hazardous areas or hard-to-reach places. Maintenance applications may, for example, include sand blasting of ship hulls, etc. Other civilian applications may include transport of small items to hard-to-reach or hazardous locations, assistance in firefighting and search & rescue operations, etc.

The robot of the present invention is also well suited for urban warfare applications. Such applications may, for example include surveillance and reconnaissance, weapon delivery, guarding a perimeter around a building, decoy applications on battle fields, etc.

Security and counter-terrorist applications are also well within the capabilities of the present invention. These tasks may, for example, include intelligence gathering about a hostile situation within a building, intelligence gathering from a ventilation duct, assistance in hostage rescue operations, etc.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A suction module for a mobile robot comprising:
a support frame defining a vacuum chamber; and
a vacuum unit supported on said support frame and communicating with said vacuum chamber, said vacuum unit including a rotating impeller and an exhaust cowling surrounding said impeller, wherein said impeller has an axis of rotation and is adapted to rotate air within said vacuum chamber and to draw air from said vacuum chamber into said impeller in a direction generally parallel to said impeller axis of rotation, and is further adapted to discharge said drawn air from said impeller in a direction substantially perpendicular to said impeller axis of rotation, and wherein said exhaust cowling is adapted to redirect said discharged air from said impeller in a direction substantially parallel to said impeller axis of rotation, whereby a thrusting force is applied to said support frame in a direction opposite to the direction of said drawn air from said vacuum chamber.

2. A suction module for a mobile robot comprising:
a support frame defining a vacuum chamber; and
a vacuum unit supported on said support frame and communicating with said vacuum chamber, said vacuum unit including a rotating impeller and an exhaust cowling surrounding said impeller, wherein said impeller has an axis of rotation and is adapted to draw air from said vacuum chamber into said impeller in a direction generally parallel to said impeller axis of rotation, and is further adapted to discharge said drawn air from said impeller in a direction substantially perpendicular to said impeller axis of rotation, and wherein said exhaust cowling is adapted to redirect said discharged air from said impeller in a direction substantially parallel to said impeller axis of rotation, whereby a thrusting force is applied to said support frame in a direction opposite to the direction of said drawn air from said vacuum chamber,
wherein said exhaust cowling comprises:
a bowl shaped outer cowling having a bottom and a dome shaped wall extending upwardly from said bottom; and
a bowl shaped inner cowling having a bottom and a dome shaped wall extending upwardly from said bottom, said inner cowling being seated in said outer cowling, whereby an annular chamber is formed between said upwardly extending walls of said inner and outer cowlings for redirecting said discharged air, and wherein said impeller is disposed between said bottoms of said inner and outer cowlings and is in communication with said annular chamber.

3. A suction module for a mobile robot comprising:
a support frame defining a vacuum chamber; and
a vacuum unit supported on said support frame and communicating with said vacuum chamber, said vacuum unit including a rotating impeller and an exhaust cowling surrounding said impeller, wherein said impeller has an axis of rotation and is adapted to draw air from said vacuum chamber into said impeller in a direction generally parallel to said impeller axis of rotation, and is further adapted to discharge said drawn air from said impeller in a direction substantially perpendicular to said impeller axis of rotation, and wherein said exhaust cowling is adapted to redirect said discharged air from said impeller in a direction substantially parallel to said impeller axis of rotation, whereby a thrusting force is applied to said support frame in a direction opposite to the direction of said drawn air from said vacuum chamber,
wherein said support frame comprises:
a support plate supporting said vacuum unit; and
a flexible skirt extending downwardly from said support plate.

4. A suction module as defined in claim 3, wherein said support frame further comprises a flexible joint connecting said support plate and said flexible skirt, said flexible joint allowing a relative displacement between said support plate and said flexible skirt.

5. A suction module as defined in claim 1, further comprising at least one drive wheel provided on said support frame for translating said suction module across a surface.

6. A suction module for a mobile robot comprising:
a support frame defining a vacuum chamber;
a vacuum unit supported on said support frame and communicating with said vacuum chamber, said vacuum unit including a rotating impeller and an exhaust cowling surrounding said impeller, wherein said impeller has an axis of rotation and is adapted to draw air from said vacuum chamber into said impeller in a direction generally parallel to said impeller axis of rotation, and is further adapted to discharge said drawn air from said impeller in a direction substantially perpendicular to said impeller axis of rotation, and wherein said exhaust cowling is adapted to redirect said discharged air from said impeller in a direction substantially parallel to said impeller axis of rotation, whereby a thrusting force is applied to said support frame in a direction opposite to the direction of said drawn air from said vacuum chamber; and
a hinge element fixed to said support frame, said hinge element adapted to couple with a hinge element of a second suction module, whereby said suction modules can be angularly oriented with respect to each other.

7. A suction module for a mobile robot comprising:
a support plate;
a flexible skirt extending downwardly from said support plate, said flexible skirt and said support plate defining a vacuum chamber;
a flexible joint connecting said support plate and said flexible skirt, said flexible joint permitting a relative displacement between said support plate and said flexible skirts, wherein said flexible skirt adapts its shape to enable the robot to maneuver over rough and uneven surfaces; and a vacuum unit supported on said support plate and communicating with said vacuum chamber, said vacuum unit including a rotating impeller adapted to rotate air within said vacuum chamber for drawing air out of said vacuum chamber.

8. A suction module as defined in claim 7, wherein said vacuum unit includes an exhaust cowling surrounding said impeller, wherein said impeller has an axis of rotation and is adapted to draw air from said vacuum chamber into said impeller in a direction generally parallel to said impeller axis of rotation, and is further adapted to discharge said drawn air from said impeller in a direction substantially perpendicular to said impeller axis of rotation, and wherein said exhaust cowling is adapted to redirect said discharged air from said impeller in a direction substantially parallel to said impeller axis of rotation, whereby a thrusting force is applied to said support frame in a direction opposite of the direction of said drawn air from said vacuum chamber.

9. A suction module for a mobile robot comprising:
a support plate;
a flexible skirt extending downwardly from said support plate, said flexible skirt and said support plate defining a vacuum chamber;
a flexible joint connecting said support plate and said flexible skirt, said flexible joint permitting a relative displacement between said support plate and said flexible skirt; and
a vacuum unit supported on said support plate and communicating with said vacuum chamber for drawing air out of said vacuum chamber, wherein said vacuum unit includes a rotating impeller and an exhaust cowling surrounding said impeller, wherein said impeller has an axis of rotation and is adapted to draw air from said vacuum chamber into said impeller in a direction generally parallel to said impeller axis of rotation, and is further adapted to discharge said drawn air from said impeller in a direction substantially perpendicular to said impeller axis of rotation, and wherein said exhaust cowling is adapted to redirect said discharged air from said impeller in a direction substantially parallel to said impeller axis of rotation, whereby a thrusting force is applied to said support frame in a direction opposite of the direction of said drawn air from said vacuum chamber,
wherein said exhaust cowling comprises:
a bowl shaped outer cowling having a bottom and a dome shaped wall extending upwardly from said bottom; and
a bowl shaped inner cowling having a bottom and a dome shaped wall extending upwardly from said bottom, said inner cowling being seated in said outer cowling, whereby an annular chamber is formed between said upwardly extending walls of said inner and outer cowlings for redirecting said discharged air and wherein said impeller is disposed between said bottoms of said inner and outer cowlings and is in communication with said annular chamber.

10. A suction module as defined in claim 7, further comprising at least one drive wheel provided on said support frame for translating said suction module across a surface.

11. A suction module for a mobile robot comprising:
a support plate;
a flexible skirt extending downwardly from said support plate, said flexible skirt and said support plate defining a vacuum chamber;
a flexible joint connecting said support plate and said flexible skirt, said flexible joint permitting a relative displacement between said support plate and said flexible skirt;
a vacuum unit supported on said support plate and communicating with said vacuum chamber for drawing air out of said vacuum chamber; and
a hinge element fixed to said support frame, said hinge element adapted to couple with a hinge element of a second suction module, whereby said suction modules can be angularly oriented with respect to each other.

12. A mobile robot comprising:
a first suction module and a second suction module, each of said first and second suction modules including a support frame defining a vacuum chamber and a vacuum unit supported on said support frame and communicating with said vacuum chamber, said vacuum unit including a rotating impeller and an exhaust cowling surrounding said impeller, wherein said impeller has an axis of rotation and is adapted to draw air from said vacuum chamber into said impeller in a direction generally parallel to said impeller axis of rotation, and is further adapted to discharge said drawn air from said impeller in a direction substantially perpendicular to said impeller axis of rotation, and wherein said exhaust cowling is adapted to redirect said discharged air from said impeller in a direction substantially parallel to said impeller axis of rotation, whereby a thrusting force is applied to said support frame in a direction opposite of the direction of said drawn air from said vacuum chamber; and
a hinge assembly pivotably connecting said first suction module to said second suction module, said hinge assembly facilitating nonplanar orientation of said first suction module with respect to said second suction module.

13. A mobile robot as defined in claim 12, wherein said hinge assembly comprises:
a hinge element fixed to one of said first and second suction modules;
a bracket element fixed to the other of said first and second suction modules, said bracket element being coupled to said hinge element about a pivot point; and
a motor disposed at said pivot point for pivoting said hinge element with respect to said bracket element about said pivot point.

14. A mobile robot as defined in claim 12, wherein said support frames of said first and second suction modules are triangular in shape for reducing the torque at said hinge assembly.

15. A mobile robot as defined in claim 12, wherein said first suction module is pivotable with respect to said second suction module through an angular range of between +90° and −90°.

16. A mobile robot as defined in claim 12, wherein said vacuum unit exhaust cowling comprises:
a bowl shaped outer cowling having a bottom and a dome shaped wall extending upwardly from said bottom; and
a bowl shaped inner cowling having a bottom and a dome shaped wall extending upwardly from said bottom, said inner cowling being seated in said outer cowling, whereby an annular chamber is formed between said upwardly extending walls of said inner and outer cowlings for redirecting said discharged air and wherein said impeller is disposed between said bottoms of said inner and outer cowling and is in communication with said annular chamber.

17. A mobile robot as defined in claim 12, wherein said support frame comprises:
 a support plate supporting said vacuum unit and fixed to said hinge assembly; and
 a flexible skirt extending downwardly from said support plate.

18. A mobile robot as defined in claim 17, wherein said support frame further comprises a flexible joint connecting said support plate and said flexible skirt, said flexible joint allowing a relative displacement between said support plate and said flexible skirt.

19. A mobile robot as defined in claim 12, wherein each of said first and second suction modules further comprises at least one drive wheel provided on said support frame for translating said suction module across a surface.

20. A mobile robot as defined in claim 12, wherein each of said first and second suction modules further comprises two independently controlled drive wheels provided on said support plate in a coaxial arrangement and a castor wheel rotatably supported on said support plate.

* * * * *

UNITED STATES PATENT AND TRADEMARK OFFICE
CERTIFICATE OF CORRECTION

PATENT NO. : 7,520,356 B2  Page 1 of 1
APPLICATION NO. : 11/400654
DATED : April 21, 2009
INVENTOR(S) : Sadegh et al.

It is certified that error appears in the above-identified patent and that said Letters Patent is hereby corrected as shown below:

TITLE PAGE:

Now reads: "Hoffman & Baron, LLP"   Should read: -- Hoffmann & Baron, LLP --

IN THE PATENT:

Column 10, lines 64-65:

Now reads: "flexible skirts"   Should read: -- flexible skirt --

Signed and Sealed this

Eleventh Day of August, 2009

David J. Kappos
*Director of the United States Patent and Trademark Office*

UNITED STATES PATENT AND TRADEMARK OFFICE
CERTIFICATE OF CORRECTION

PATENT NO.        : 7,520,356 B2                              Page 1 of 1
APPLICATION NO.   : 11/400654
DATED             : April 21, 2009
INVENTOR(S)       : Sadegh et al.

It is certified that error appears in the above-identified patent and that said Letters Patent is hereby corrected as shown below:

TITLE PAGE, ITEM (74):

Now reads:   "Hoffman & Baron, LLP"   Should read:   -- Hoffmann & Baron, LLP --

IN THE PATENT:

Column 10, lines 64-65:

Now reads:   "flexible skirts"        Should read:   -- flexible skirt --

This certificate supersedes the Certificate of Correction issued August 11, 2009.

Signed and Sealed this

First Day of September, 2009

David J. Kappos
*Director of the United States Patent and Trademark Office*